US 6,757,258 B1

(12) United States Patent
Pillay-Esnault

(10) Patent No.: US 6,757,258 B1
(45) Date of Patent: Jun. 29, 2004

(54) METHOD AND APPARATUS FOR REDUCING OSPF FLOODING

(75) Inventor: Padmadevi Pillay-Esnault, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/565,594

(22) Filed: May 4, 2000

(51) Int. Cl.$^7$ ............................. H04L 12/28; H04J 3/16
(52) U.S. Cl. ..................... 370/254; 370/255; 370/466
(58) Field of Search ............................. 370/252, 254, 370/255, 401, 390, 392, 466, 395.2; 709/220

(56) References Cited

U.S. PATENT DOCUMENTS 5,687,168 A * 11/1997 Iwata ........................... 370/255
6,147,971 A * 11/2000 Rochberger et al. ........ 370/238
6,349,091 B1 * 2/2002 Li ................................ 370/238
6,418,139 B1 * 7/2002 Akhtar ......................... 370/356

OTHER PUBLICATIONS

"Open Shortest Path First", *Internetworking Technologies Handbook*, Chapter 46, p. 46–46–6, 1999. (no month).

* cited by examiner

*Primary Examiner*—Duc Ho
(74) *Attorney, Agent, or Firm*—Sierra Patent Group, Ltd.

(57) ABSTRACT

A method and apparatus for reducing OSPF flooding is provided for a router device. The flood reduction invention enables hello protocol communication while providing do not age link state advertisements. When a change in network topology is determined, subsequent do not age link state advertisements are communicated to convey the change of network topology with outer routers.

2 Claims, 2 Drawing Sheets

METHOD AND APPARATUS FOR REDUCING OSPF FLOODING

BACKGROUND OF THE INVENTION

1. Field of the Invention

This invention pertains generally to OSPF (open shortest path first) routing protocols. More particularly, the invention is a method and apparatus for reducing OSPF flooding which provides fast convergence and recovery when there is a change in network topology.

2. The Prior Art

Routing protocols for use on computer networks as well as the global information network (commonly known as the Internet) are known the art. For example, TCP/IP (Transmission Control Protocol/Internet Protocol) is a widely used networking protocol that provides communication across interconnected networks, between computers with diverse hardware architectures and various operating systems.

OSPF (Open Shortest Path First) is another routing protocol used over local area networks (LANs), wide area networks (WANs) and the Internet. OSPF is a link-state routing algorithm that is used to calculate routes based on the number of routers, transmission speeds, delays and route costs. In general, OSPF supports three kinds of connection and networks: point-to-point lines between two routers; multiaccess networks with broadcasting (e.g., most LANs); and multiaccess networks without broadcasting (e.g., most packet-switched WANs).

A multiaccess network is one that can have multiple routers on it, each of which can directly communicate with all the others (i.e., a "mesh" topology). A serial connection between two routers is represented by a pair of arcs, one in each direction. OSPF works by abstracting the collection of actual networks, routers, and lines into a directed graph in which each arc is assigned a cost (distance, delay, etc.) It then computes the shortest path based on the weight on the arcs.

In conventional OSPF, the OSPF router protocol must refresh its Link State Advertisements (LSAs) at periodic intervals (typically every 1800 seconds or 30 minutes), otherwise the LSA data will expire in the other routers of the network. The LSA data includes, for example, information regarding the cost of the connection, the type of connection, and which nodes the router is connected, among other information. The refreshing of LSA data is carried out regardless of whether the information has changed or not. The purpose for refreshing LSA data is to provide a certain level of robustness—at most, the LSA data in routers is outdated by only 30 minutes. On the other hand, even if the network topology is stable and unchanging, the OSPF will still generate traffic in order to refresh LSA data in the other routers. Internet Service Providers and users having large networks have noticed this non-negligible protocol traffic.

Some implementations have tried to improve the flooding caused by LSA traffic by reducing its refresh frequency from 30 minutes to around 50 minutes or more. This solution presents the advantage of reducing the amount of refresh traffic but will require at least one refresh before the LSA expires. Another disadvantage with increasing the refresh times of LSA is that the time period during which potentially incorrect LSA data is resident in the other routers correspondingly increases.

The existing OSPF Demand Circuit (DC) feature utilizes a "Do Not Age" (DNA) LSA implementation. The purpose of OSPF DC is to reduce the cost associated with data line transmissions. For example, where data is communicated over ISDN (integrated services digital line), X.25 or ATM (asynchronous transfer mode) there is a cost associated with the transfer. OSPF DC attempts to reduce refreshing and flooding of already known and unchanged information. To this end, the LSA will now be flooded with the higher bit set thus making them DNA LSA. In addition, several other protocols are disabled to reduce traffic over the communication lines. For example, DC suppresses "hellos" between adjacent neighbors. As a consequence, the suppression of hellos will delay the knowledge that the neighbor has gone down or otherwise terminated communication. While the DC feature generally reduces overhead and therefore reduces the cost of operating the network, there is a lack of convergence and recovery is delayed when there is a change in the network topology. Consequently, packets may be lost and network performance may suffer in DC arrangements.

Accordingly, there is a need for a method and system for reducing OSPF flooding and traffic due to refreshing LSA which provides fast convergence and recovery when there is a change in network topology. The present invention satisfies these needs, as well as others, and generally overcomes the deficiencies found in the background art.

BRIEF DESCRIPTION OF THE INVENTION

The invention is a method and system for reducing OSPF flooding and traffic in a networked system. The invention is generally embodied in software executed by one or more router devices in the system. The flood reduction algorithm may be enabled for one or more ports of the router device. The flood reduction algorithm may further be used in conjunction with conventional OSPF and OSFF DC where flood reduction is not enabled for a particular port. For example, a router may comprise a first and second interface port, the first port configured with flood reduction and the second configured for conventional OSPF.

The invention relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

According to a first embodiment of the invention, the method for reducing OSPF protocol flooding comprises enabling the hello protocol for a flood reduction-enabled port and communicating a do not age link state advertisement via the port. When a change in the network topology is subsequently determined, the method further comprises communicating subsequent do not age link state advertisements to communicate the change in network topology when the change in topology is determined.

According to a second embodiment of the invention, the flood reduction apparatus comprises means for enabling hello protocol for a flood reduction-enabled port and means for communicating do not age link state advertisements via the port.

An object of the invention is to provide method and system for reducing OSPF flooding which overcomes the deficiencies of the prior art.

Another object of the invention is to provide a method and system for reducing OSPF flooding which provides fast convergence and recovery when there is a change in network topology Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
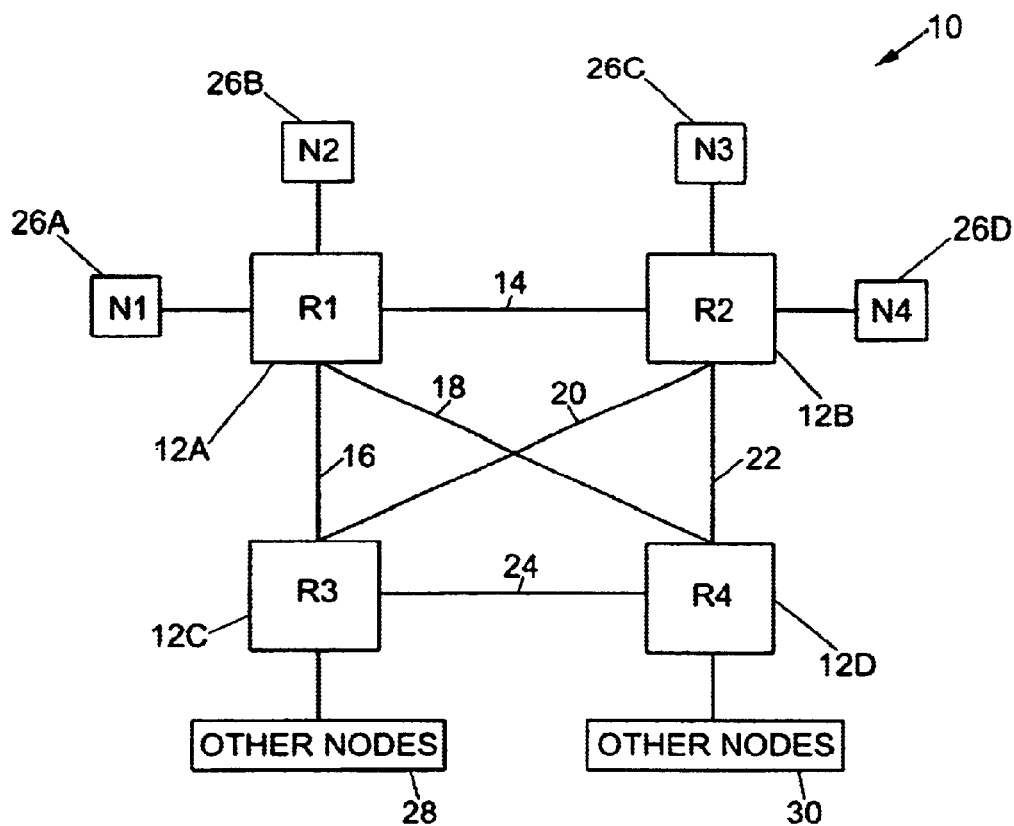
FIG. 1 is a functional block diagram of a system suitable for use with the present invention.
Figure 2:
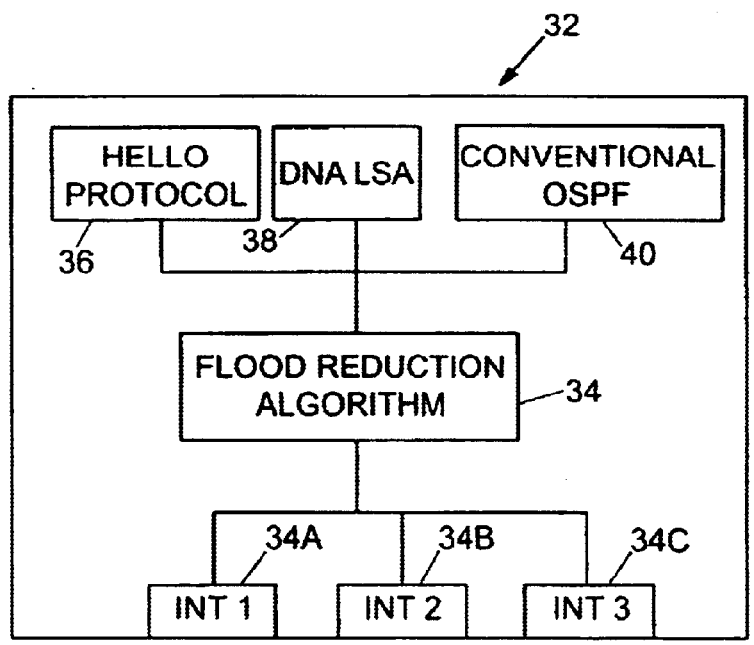
FIG. 2 is a functional block diagram of a router device executing the algorithm of the present invention.
Figure 3:
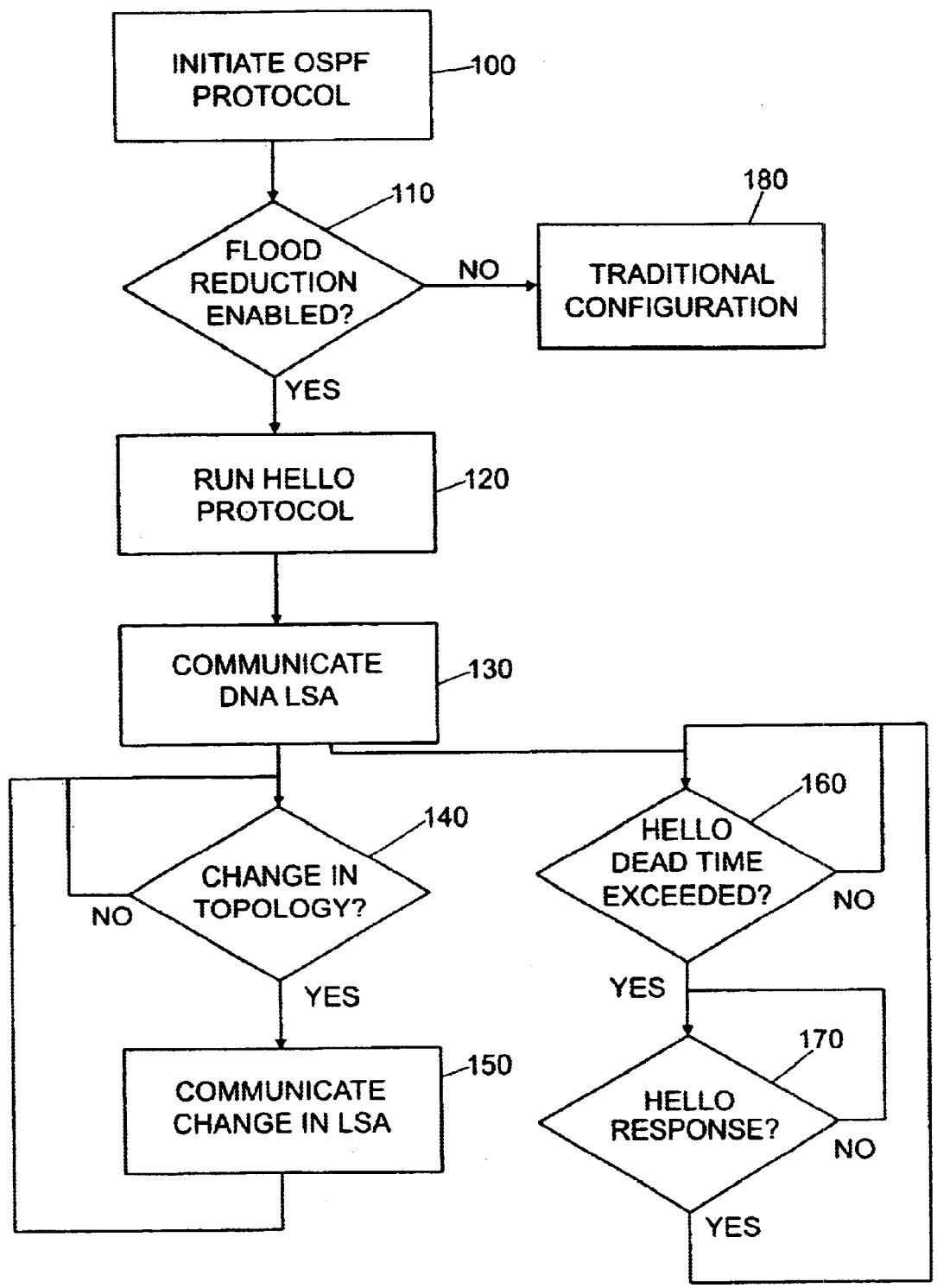
FIG. 3 is flow chart showing generally the method of the present invention.

Referring more specifically to the drawings, for illustrative purposes the present invention is embodied in the apparatus shown in FIG. 1 and FIG. 2 and the method outlined in FIG. 3. It will be appreciated that the apparatus may vary as to configuration and as to details of the parts, and that the method may vary as to details and the order of the steps, without departing from the basic concepts as disclosed herein. The invention is disclosed generally in terms of a method and system for reducing OSPF flooding, although numerous other uses for the invention will suggest themselves to persons of ordinary skill in the art.

Referring first to FIG. 1, there is shown a block diagram of a network system 10 suitable for use with the present invention. The network 10 may comprise a Local Area Network (LAN), Wide Area Network (WAN), or other network topology utilizing routers as is known in the art, including for example Internet service providers with backbone connections.

Network 10 includes a plurality of routers, identified as router 1 (R1 designated as 12a), router 2 (R2 designated as 12b), router 3 (R3 designated as 12c), and router 4 (R4 designated as 12d). Routers 12a through 12d comprise convention data processing means or computers, and as such, comprise conventional hardware components (not shown) including a central processor unit (CPU), memory (volatile and non-volatile), and input/output devices as is known in the art. It is noted that system 10 comprising four router devices is only illustrative and that the invention is suitable for use with other network topologies.

Each router 12a through 12d further comprises a plurality of data interface ports between which data is routed to other devices and through which the router is coupled to the other devices. As depicted in FIG. 1, R1 (12a) is coupled to R2 (12b) via line 14. R1 (12) is also coupled to R3 (12c) via line 16 and to R4 (12d) via line 18. R2 (12b) is also coupled to R3 (12c) via line 20 and to R4 (12d) via line 22. R3 (12c) is further coupled to R4 (12d) via line 24. Lines 14 through 24 generally comprise a leased line via a public switched network, such as ISDN (integrated services digital line), X.25 or ATM (asynchronous transfer mode), for example.

Each router 12a through 12d is further coupled to one or more nodes of the network. As shown in FIG. 1, R1 (12a) is further coupled to Nodes N1 (26a) and N2 (26b). R2 (12b) is further coupled to Nodes N3 (26c) and N4 (26d). R3 (12c) is further coupled to other nodes 28, and R4 (12d) is further coupled to other nodes 30. The nodes of the network 26a through 30 may comprise a network device or data processing means. By way of illustration, N1 (26a) may be a first network server, N2 (26b) may be a network desktop client, N3 (26c) may be a second network server, and N4 (26d) may be a network printing device. Other various arrangements are possible as is known in the art.

Since network 10 comprises a "mesh" topology (each router 12a through 12d is coupled to each of the other routers), the nodes of the network may access other nodes of the network via a variety of paths. For example, N2 (26b) may access N3 (26c) via a R1 (12a), line 14, and R2 (12b). N2 (26b) may alternatively access N3 (26c) via R1 (12a), line 16, R3 (12c), line 24, R4 (12d), line 22 and R2(12b). Other paths between N2 (26b) and N3 (26c) also exist. As noted above, a serial connection between two routers is represented by a pair of arcs, one in each direction. OSPF abstracts the collection of actual networks, routers, and lines into a directed graph in which each arc is assigned a cost (distance, delay, etc.) It then computes the shortest path based on the weight on the arcs.

The present invention is a flood reduction (FRE) software algorithm executed by the routers R1 through R4 (12a through 12d) of the network 10. The FRE is normally incorporated into the router operating system executed by the routers (12a through 12d), or may alternatively be executed as a separate application. More particularly, the FRE algorithm is normally incorporated into the OSPF protocol engine (not shown) and provides the flooding reduction enhancement described herein.

FIG. 2 generally shows a router device 32 executing the FRE algorithm 34 of the present invention. Routers 12a through 12d are configured substantially as router 32 described herein. Router 32 comprises conventional hardware components (not shown) including a CPU, memory, and input/output devices. The router operating system (not shown) is loaded during the startup of the router 32 and provides the basic command functions for the routing device as well as various components which provide specific functions or routines provided by the router 32. The OSPF protocol and the FRE algorithm 34 are also loaded during startup.

The FRE algorithm 34 is coupled to a plurality of communication interface ports, identified as INT1 (34a), INT2 (34b) and INT3 (34c) in FIG. 2. The FRE algorithm 34 is configured to provide flood reduction of Link State Advertisements (LSA) via INT1 (34a), INT2 (34b) and INT3 (34c). In general, INT1 (34a), INT2 (34b) and INT3 (34c)) are serial communication interfaces allowing one router to communicate with another router. However, flood reduction may be carried over other communication interfaces including Ethernet connection, for example. It will be apparent by those skilled in the art and having this disclosure that router 32 having three communication interfaces is only illustrative and the FRE algorithm 34 may be used with one or more communication interfaces.

Flood reduction may be carried out by FRE 34 for one or more of the interface ports (34a through 34c). For example, INT1 (34a) may be configured for flood reduction, while INT2 (34b) and INT3 (34c) may be configured for conventional LSA flooding and refreshing or OSPF DC. Such settings may be configured by the network administrator according to the needs and demands of the network. In general, flood reduction is enabled for ports connected to neighboring routers accessed across a leased public switched network (ISDN or ATM, for example). Ports connected to local networks are not generally configured for flood reduction, but may be configured so when desired. Referring back to FIG. 1, router R1 (12a) will generally enable flood reduction for ports attached to lines 14, 16 and 18 since lines 14, 16 and 18 connect to neighboring routers R2 (12b), R3 (12c) and R4 (12d) respectively. Flood reduction is generally disabled for ports attached to local nodes N1 (26a) and N2 (26b).

A toggle (on/off) field for defining whether flood reduction is enabled for a port may be stored in a conventional data storage facility. In general, the flood reduction settings are stored in the same configuration file which contains the other routing data.

In operation, the FRE algorithm 34 provides flood reduction for ports configured for flood reduction. Otherwise, conventional OSPF is carried out for ports not configured for flood reduction. Accordingly, the FRE algorithm 34 is coupled to a "hello protocol" component 36, a "DNA (do not age) LSA" component 38 and a "conventional OSPF" component 40. Where flood reduction is enabled for a particular, the FRE algorithm runs the "hello protocol" 36 for the port and communicates "DNS LSA" via the port.

The "hello protocol" 36 is communicated between the local router and its neighboring router across the communication port. In general, this protocol is communicated every 10 seconds and is used for ascertaining the state of the neighboring router according the response or lack of response provided by the neighboring router. After a "dead interval" has lapsed wherein the neighboring router fails to respond, the local router will consider the neighboring router down and the associated nodes connected to the neighboring router unreachable. For example, where R1 (12a) discovers that R2 (12b) has gone down, Node 26b is then made aware that R2 is unreachable via a conventional dead timer that expires on R1. In contrast, prior art OSPF DC would not normally be able to discover the unavailablity of R2 (12b) and its associated network (nodes N3 (26c) and N4 (26d)) until a communication is attempted across line 14 from R1 to R2 by one of the nodes N1 (26a) or N2 (26b). As a result, packets communicated by N2 to N3 are dropped. As noted above, this is because the "hello protocol" is disabled in DC for the purposes of keeping line 14 down.

The DNA LSA 38 is implemented by the FRE 34 via ports enabled for flood reduction. LSA includes such information as network address, network mask, advertising router, metrics, for example, and such information is used by the recipient routers for calculating the best route to the destinations. DNA LSA is specified by setting a "DO NOT AGE" bit with the LSA. This DNA LSA is communicated by the FRE 34 via ports enabled for flood reduction. Unlike conventional LSA which expires after a predetermined time (normally thirty minutes), the DNA will not expire and thus will not need to be refreshed at the expiration period. Rather, subsequent DNA LSA are communicated only upon certain events, such as a change in network topology. For example, if R1 (12a) determines that N1 (26a) is no longer available, a update will need to be made in R2 through R4 (12b through 12d, respectively) to indicate the change in the network topology connected to R1 (12a).

According to this implementation, LSA will not be periodically refreshed due to expiration, but rather DNA LSA will be updated only when required, such as when a change in network topology takes place. This implementation improves bandwidth and reduces overall network traffic between routers by requiring refreshing of LSA data only when necessary. Since the present implementation further provides a "hello protocol" (as noted above), the discovery of unavailable routers and networks is quickly ascertained and provides a more reliable solution to that of the OSPF DC feature.

The invention provides backward compatibility with routers not capable of or not configured to provide flood reduction. As noted above, the interface ports for each router may be configured to provide conventional OSPF, such as flooding LSA or DNA LSA. For example, if R4 (12d) is a router not capable of or not configured to execute the flood reduction algorithm of the present invention, R1 (12a) may configure its communication port to line 18 for conventional OSPF. In the case where R4 (12d) is configured to run as DC, the FRE 34 (of R1) will provide DNA LSA to R4 (12d). "Hellos" between R1 (12a) and R4 (12d) are not communicated in this case.

The FRE 32 uses a "DC-bitless" LSA to detect the presence of routers not supporting DC. DC-bitless LSA is a mechanism that is used by all router that support DC feature. If a router is DC capable, it will set a particular bit. Older routers and non-capable router do net this bit. Where R4 (12) is not configured to run as DC, the FRE 34 (of R1) will provide conventional "aging" LSA to R4 (12).

The method and operation of invention will be more fully understood with reference to the flow chart of FIG. 3, as well as FIG. 1 and FIG. 2. The order of actions as shown in FIG. 2 and described below is only exemplary, and should not be considered limiting.

At box 100, the OSPF protocol is initiated in the router. The OSPF protocol is normally initiated during the startup of the router, when other subsystems and other protocols are loaded by the router operating system. When the OSPF protocol is initiated, the FRE 34 is also initiated. The FRE 34 operates in conjunction with the OSPF to provide flood reduction on ports of the router 32. Diamond 110 is then carried out.

At diamond 110, the FRE 34 determines the configuration of each port (34a through 34c) of the router 32. A user of the router 32 may configure one or more of the ports (34a through 34c) for flood reduction. The flood reduction settings for the port configuration may be stored in a conventional storage space, but is typically defined in a central configuration storage space, such as the router's config file. If flood reduction is enabled for a port, box 120 is then carried out. Otherwise box 200 is carried out for conventional OSPF.

At box 120, the FRE 34 has determined that a port is configured for flood reduction. Accordingly, the FRE 34 enables the hello protocol 36 to execute via the flood reduction-enabled port. With the hello protocol 36 executing, "hello" commands as transmitted periodically (typically every 10 seconds) to another remote router which is coupled to the flood reduction-enable-port of the local router 32. "Hello" transmissions are used by the local router 32 to determine the operational state of the remote router and whether the remote router and the network attached to the remote router are accessible. Box 130 is then carried out.

At box 130, the FRE 34 communicates DNA LSA via the flood reduction-enabled port. The DNA LSA has its DNA-bit set or enabled to indicate that the data in the DNA LSA will not need to be refreshed periodically. Accordingly there will be a dramatic reduction in traffic overhead via the flood reduction-enabled port. Diamond 140 and diamond 160 is then carried out.

At diamond 140, the FRE 34 determines whether there is change is topology in the local network. For example, the FRE in R1 (12*a*) would determine whether there has been a change in topology in its local network (e.g., whether nodes N1 (26*a*) and N2 (26*b*) still active or whether any new local nodes have been activated). If there is change in topology box 150 is carried out. Otherwise diamond 140 is repeated to determine prospective changes is topology.

At box 150, the FRE 34 has determined that a change in topology in the local network has occurred. Accordingly a change in LSA (modified DNA LSA) is communicated via the flood reduction-enabled ports to remote routers to communicate the change in topology. Preferably, only the change in LSA data is communicated, rather than the entire DNA LSA to thereby reduce bandwidth use. When the remote routers-received the change in LSA data, modifications are made to each router's respective LSA database to indicate the change in topology. Diamond 140 is then repeated to determine prospective changes is topology.

At diamond 160, the FRE 34 determines whether the "dead time" interval has been exceeded. As noted above, hello commands are transmitted periodically to remote routers via the flood reduction-enabled ports. When the remote router fails to respond within a predetermined time period (normally four times the "hello" interval), the "dead time" interval has been exceeded. The "hello" interval is configurable and is normally ten (10) seconds for point to point links. Accordingly, the remote router and its associated network are considered to be unreachable. If the "dead time" interval is exceeded, diamond 170 is carried out. Otherwise, diamond 160 repeated.

At diamond 170, the FRE 34 has determined from the hello protocol, that the "dead time" interval has been exceeded. The remote (neighbor) router and its associated network are thus considered unreachable. The FRE 34 continues to run the hello protocol 36 and determines whether the remote router (currently considered unreachable) has responding to a hello command. If a hello response is received, the remote (neighbor) router and its associated network are considered reachable. Diamond 160 is then repeated.

At box 180, the FRE 34 determines that a port is configured for conventional OSPF. The FRE 32 communicates a "DC-bitless" LSA to detect the presence of remote routers not supporting DC. Where the remote router is not configured to run as DC, the FRE 34 will provide conventional "aging" LSA to the remote router. Otherwise OSPF DC is communicated to the remote LSA with the hello protocol 36 disabled.

Accordingly, it will be seen that this invention provides a method and system for reducing OSPF flooding which provides fast convergence and recovery when there is a change in network topology. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. In a router having at least one port, said router coupled to a network having a known network topology, a method for reducing OSPF (open shortest path first) protocol flooding comprising:

transmitting a first do not age link state advertisement via said port;

enabling a hello protocol to periodically transmit and receive hello messages with a neighboring node to determine whether a connection exists from said port to said neighboring node responsive to transmitting said first do not age link state advertisement;

determining whether there is a change in the network topology; and transmitting a second do not age link state advertisement via said port responsive to a determination of a change in the network topology.

2. A program storage device readable by a machine, tangibly embodying a program of instructions executable by the machine to perform a method for reducing OSPF (open shortest path first) protocol flooding in a router having at least one port, said router coupled to a network having a known network topology, said method comprising:

transmitting a first do not age link state advertisement via said port; and enabling a hello protocol to transmit and receive hello message with a neighboring node over said port to determine whether a connection exists between said port and said neighboring node responsive to transmitting said first do not age link state advertisement;

determining whether there is a change in the network topology; and transmitting a second do not age link state advertisement via said port responsive to a determination of a change in the network topology.

\* \* \* \* \*